(12) United States Patent
Rippel et al.

(10) Patent No.: US 8,970,075 B2
(45) Date of Patent: Mar. 3, 2015

(54) LIQUID COOLED ELECTRIC MOTOR

(75) Inventors: Wally E. Rippel, Altadena, CA (US); Christopher C. Moore, La Verne, CA (US); Paul F. Carosa, Covina, CA (US)

(73) Assignee: AC Propulsion, Inc., San Dimas, CA (US)

( * ) Notice: Subject to any disclaimer, the term of this patent is extended or adjusted under 35 U.S.C. 154(b) by 135 days.

(21) Appl. No.: 13/570,169

(22) Filed: Aug. 8, 2012

(65) Prior Publication Data

US 2014/0042841 A1 Feb. 13, 2014

(51) Int. Cl.
*H02K 9/19* (2006.01)
*H02K 5/20* (2006.01)

(52) U.S. Cl.
USPC .............................. 310/54; 310/60 A; 310/61

(58) Field of Classification Search
None
See application file for complete search history.

(56) References Cited

U.S. PATENT DOCUMENTS

| | | | |
|---|---|---|---|
| 3,480,810 A | 11/1969 | Potter | |
| 3,791,331 A | 2/1974 | Dilley | |
| 3,822,967 A * | 7/1974 | Cade et al. | 417/368 |
| 3,883,273 A * | 5/1975 | King | 417/410.3 |
| 3,922,114 A * | 11/1975 | Hamilton et al. | 417/366 |
| 4,181,474 A * | 1/1980 | Shaw | 417/366 |
| 4,198,191 A | 4/1980 | Pierce | |
| 4,311,932 A | 1/1982 | Olson | |
| 4,647,805 A | 3/1987 | Flygare et al. | |
| 5,448,118 A | 9/1995 | Nakamura et al. | |
| 5,698,912 A | 12/1997 | Rasch et al. | |
| 5,831,409 A | 11/1998 | Lindberg et al. | |
| 6,121,707 A | 9/2000 | Bell et al. | |
| 6,191,511 B1 | 2/2001 | Zysset | |
| 6,281,610 B1 | 8/2001 | Kliman et al. | |
| 6,329,731 B1 | 12/2001 | Arbanas et al. | |
| 6,685,447 B2 * | 2/2004 | Mabe et al. | 417/423.8 |
| 6,727,609 B2 * | 4/2004 | Johnsen | 310/52 |
| 6,994,602 B2 | 2/2006 | Ries | |
| 7,002,318 B1 | 2/2006 | Schulz et al. | |
| 7,156,195 B2 | 1/2007 | Yamagishi et al. | |
| 7,489,057 B2 | 2/2009 | Zhou et al. | |
| 7,569,955 B2 | 8/2009 | Hassett et al. | |
| 7,950,481 B2 | 5/2011 | Betz et al. | |
| 8,022,582 B2 * | 9/2011 | Dames et al. | 310/54 |
| 2003/0132673 A1 * | 7/2003 | Zhou et al. | 310/54 |
| 2005/0023266 A1 | 2/2005 | Ueno et al. | |
| 2008/0024020 A1 * | 1/2008 | Iund et al. | 310/61 |
| 2008/0179982 A1 | 7/2008 | Kramer | |
| 2010/0127585 A1 | 5/2010 | Fee et al. | |

FOREIGN PATENT DOCUMENTS

WO 2008/012269 1/2008

OTHER PUBLICATIONS

International Search Report and Written Opinion in International Application No. PCT/US2013/054013, mailed Feb. 3, 2014.

* cited by examiner

*Primary Examiner* — Tran Nguyen
(74) *Attorney, Agent, or Firm* — Charles C. H. Wu; Charles C. H. Wu & Associates, APC

(57) ABSTRACT

A liquid-cooled, radial air gap electric motor includes a stator, a rotor, a rotor shaft, two end bells, a housing, a coolant manifold system, and a coolant sump. The rotor includes a plurality of axially directed slots located near its periphery. The coolant manifold system directs a first portion of liquid coolant to flow past some portion of the stator and a second portion of liquid coolant to flow through the rotor slots. Some or all of the liquid coolant is received by the coolant sump from which the coolant may be recirculated.

24 Claims, 9 Drawing Sheets

LIQUID COOLED ELECTRIC MOTOR

TECHNICAL FIELD

The present disclosure is directed generally to the field of electric motors.

BACKGROUND

In electric motors, torque is approximately proportionate to the product of current and magnetic flux density. In turn, two primary loss components exist which are related to these two quantities. The current-related loss component is due to current flow through conductors (e.g., losses within windings and rotor bars); this loss component is proportionate to the square of the rms current. The second loss component physically takes place in magnetic core elements such as the laminations and is approximately proportionate to the square of the product of magnetic flux density and electrical frequency. Two key consequences of these relations are first that energy efficiency is optimized at points of operation where the conductor and magnetic losses are approximately equal; and second that through-power can be increased without loss of efficiency provided speed (electrical frequency) is maintained proportionate to torque.

As speed and torque are increased, heat dissipation increases. Therefore improved cooling methods are required to limit temperatures to required values. In the case of induction motors this is a particular challenge as a significant fraction of the total heat dissipation physically occurs within the rotor due to the $I^2R$ losses associated with the rotor bars and end rings. Air cooling generally becomes insufficient when heat flux values exceed associated thresholds. Unfortunately, liquid cooling techniques for such rotors have proved cumbersome in the past due to problems associated with transferring fluid flow between rotating and non-rotating members. Additional problems exist, such as preventing the radial air gap between the rotor and stator from flooding with coolant as this greatly adds to drag loss at high speeds. Other challenges with liquid cooling include ease of mechanical assembly, uniformity of cooling, prevention of air entrapment in the coolant, and in some cases, the need for insulating the rotor and stator from the housing.

OVERVIEW

A liquid-cooled, radial air gap electric motor includes a stator, a rotor, a rotor shaft, two end bells, a housing, a coolant manifold system, and a coolant sump. The rotor includes a plurality of axially directed slots located near its periphery. The coolant manifold system directs a first portion of liquid coolant to flow past some portion of the stator and a second portion of liquid coolant to flow through the rotor slots. Some or all of the liquid coolant is received by the coolant sump from which the coolant may be recirculated.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DESCRIPTION OF EXAMPLE EMBODIMENTS

Figure 1:
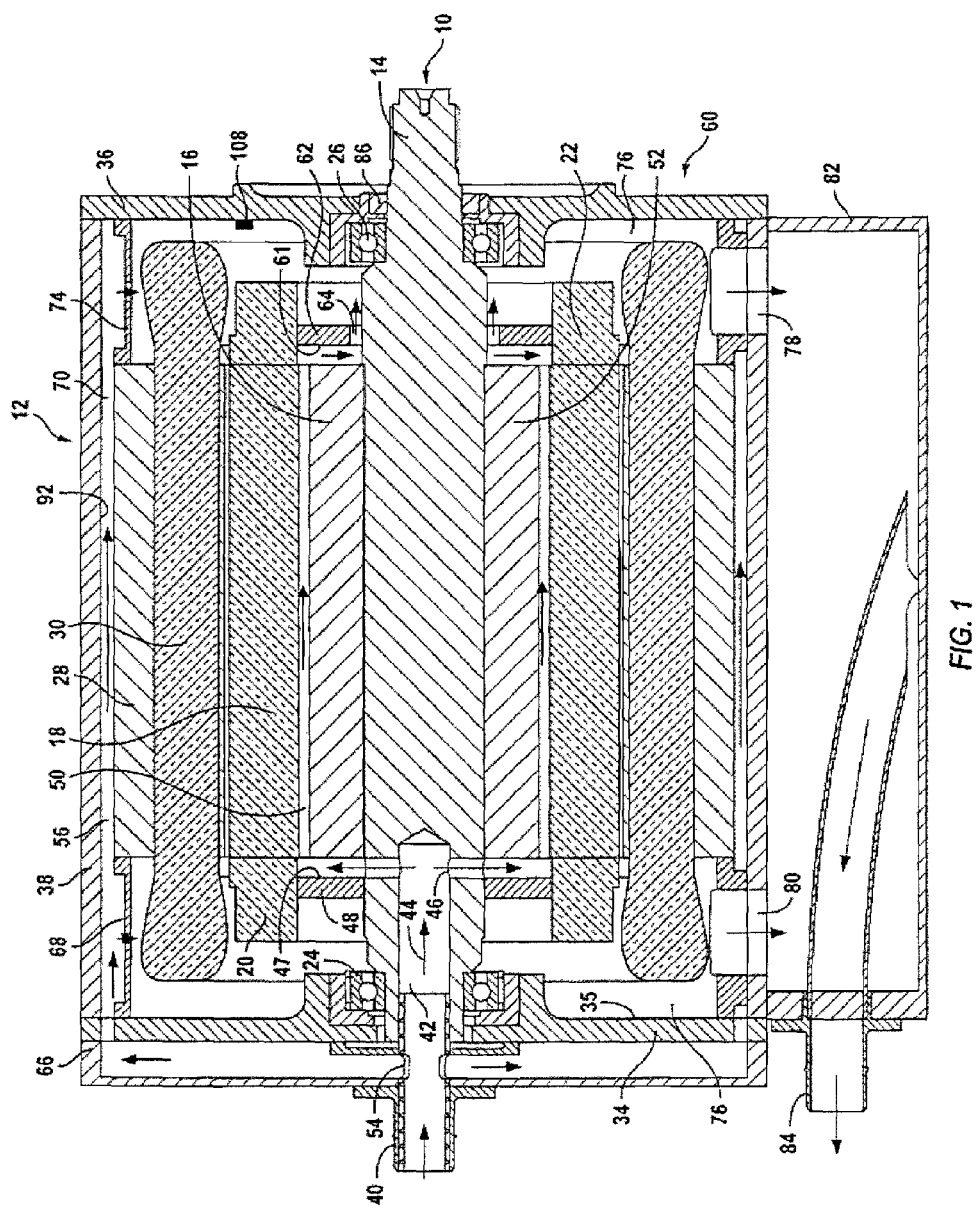
FIG. 1 is a section view of an electric motor which identifies coolant flow paths in accordance with an embodiment.

Example embodiments are described herein in the context of an electric traction motor useable, for example, as a drive motor for an electrically-powered vehicle. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment a liquid coolant flow is provided to an electric motor so that the volume of coolant is controlled so that a volume of air persists within the motor so that the rotor-stator radial air gap is not flooded with the coolant. For many of the internal flow paths, liquid-tight seals need not be provided—thus saving expense. The only truly liquid-tight seals that are required are those which interface between the coolant and the external environment. This approach does not require the use of a scavenge pump—only a simple coolant recirculating pump—thus saving further expense.

In accordance with one embodiment, a manifold system directs a first portion of a liquid coolant feed to flow over a peripheral surface of a stator of a liquid-cooled electric motor, while directing a second remaining portion of the liquid coolant feed to flow into the rear end of the rotor shaft. Additional coolant flow paths may also be included. The second portion of the liquid coolant feed then exits the shaft via radially directed holes in the shaft and is then directed by an endplate to flow through axial passages or ports within the rotor. At the opposite end of the rotor, flow is received by a similar endplate and is then directed to either re-enter the shaft, or to exit the endplate at a location which is close to the axis of rotation, thus minimizing kinetic losses under high-speed conditions. The two endplates also enable easier balancing of the electric motor during manufacture by allowing screws or bolts of selected lengths to be inserted at desired locations. (Alternatively, material can be removed from selected portions of the endplates to achieve the desired balance in the conventional manner.) Finally, the endplates serve to capture cast end rings via peripheral corresponding keyed elements—thus enabling high-speed operation without mechanical failure of the end rings, while alleviating the need for external capture rings. (Alternatively, conventional external capture rings can be placed over the end rings to provide the needed hoop support for the end rings.) Coolant flow from both the stator and rotor is recovered by a sump located at the bottom of the motor. The coolant sump serves to allow entrapped air to separate from the coolant.

Figure 2:
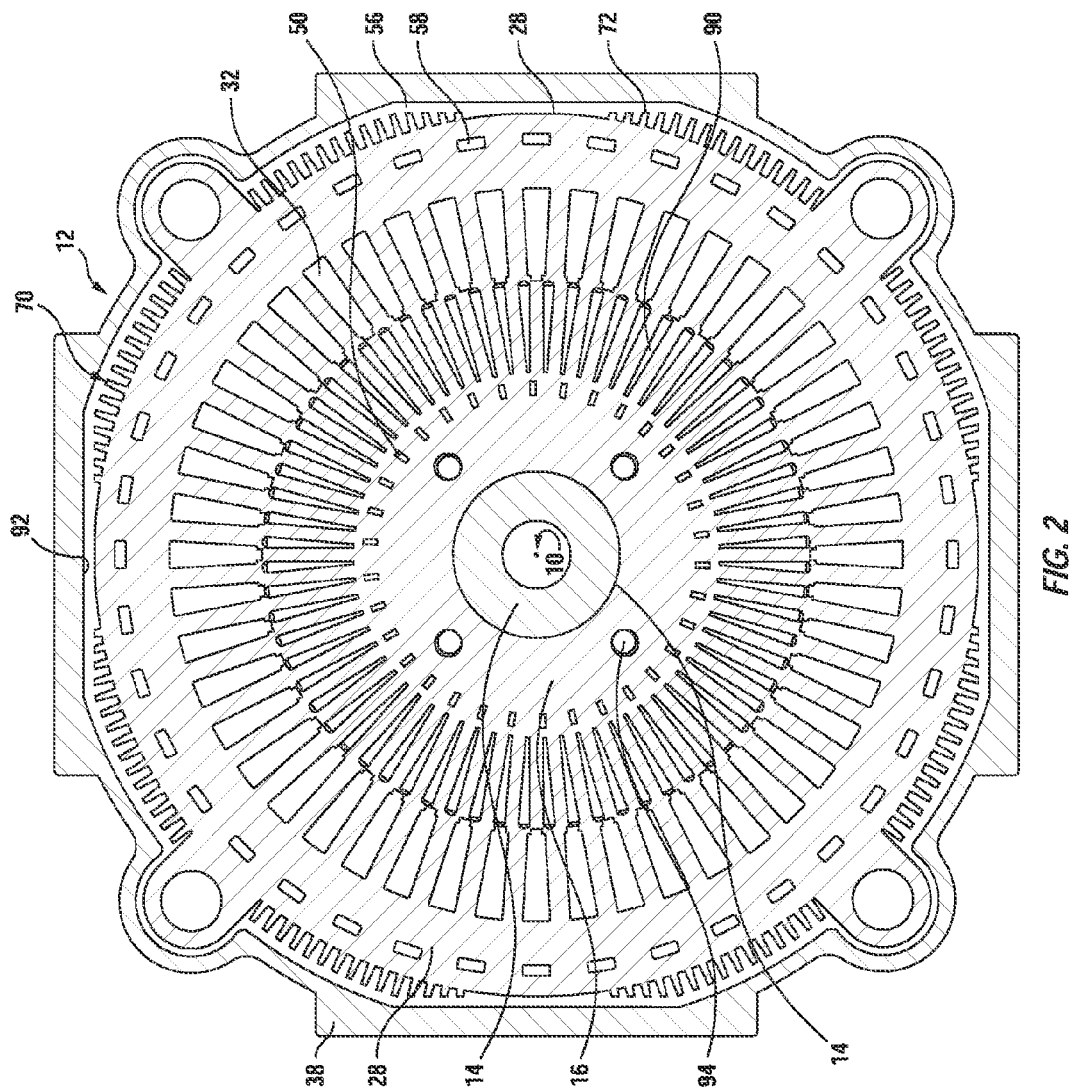
FIG. 2 is a section view which depicts a rotor, stator and housing for an electric motor in accordance with an embodiment.

Turning now to the figures, FIG. 1 is a sectional view along a longitudinal axis of rotation 10 of an electric motor 12 which identifies coolant flow paths (shown by unnumbered arrows) in accordance with an embodiment. FIG. 2 is a cross-sectional view taken along line 2-2 of FIG. 1 orthogonal to the view in FIG. 1. Electric motor 12 includes both conventional and new elements. The conventional elements include rotor shaft 14, rotor core 16, rotor bars 18, rear rotor end-ring 20, front rotor end-ring 22, rear rotor shaft bearing 24, front rotor shaft bearing 26, stator core 28, motor windings 30 contained within stator slots 32 of the stator core 28, rear end-bell 34, rear end-bell interior face 35, front end-bell 36, and housing 38.

The liquid cooling system comprises parts which enable the flow of a liquid coolant such that heat is removed from the rotor bars 18, end-rings 20 and 22, the active part of the windings 30, the end turn portions of the motor windings 30 and the stator core 28. Coolant inlet port 40 receives a flow of liquid coolant (e.g., from a recirculating coolant pump (shown in FIG. 6)) and directs a first portion of the flow of liquid coolant to a coaxial shaft port 42 within the rear end of the rotor shaft 14 from where flow radially exits a hollowed out portion 44 of rotor shaft 14 through one or more shaft radial holes 46 and is directed by an interior surface 47 of rotor rear endplate 48 to flow through a rotor coolant passage formed by rotor axial cooling slots 50 within the rotor assembly 52.

A second portion of the flow of liquid coolant is directed from coolant inlet port 40 through inlet radial holes 54 within coolant inlet port 40 to establish flow through annular port or peripheral coolant passage 56—bounded by housing 38 and the periphery of stator core 28. Alternatively, this second portion of flow may also include flow paths within stator cooling slots 58 (illustrated in FIG. 2). At the front end of the motor 60, coolant which exits rotor axial cooling slots 50 (also referred to as the rotor coolant passage) is contained and directed by interior surface 61 of rotor front endplate 62 toward coolant exit port 64 in rotor front endplate 62 which is close to the longitudinal axis of rotation 10. (By constraining the fluid to exit close to the center of rotation, kinetic losses are minimized.)

Coolant flow for the stator, after exiting inlet radial holes 54 in coolant inlet port 40, is directed by a combination of coolant inlet manifold 66 and rear coolant baffle 68 to flow through annular port 56 such that heat is removed from the peripheral surface 70 of the stator core 28. In accordance with one embodiment, radially directed cooling fins 72 (illustrated in FIG. 2) may be added to the periphery of stator core 28 to augment this element of heat transfer. Coolant flow received from annular port 56 is constrained to pass through holes within front coolant baffle 74. The number of these holes and their respective diameters are selected such that a desired pressure drop occurs—which in turn establishes flow uniformity within the annular port. This helps establish uniform cooling for stator core 28 and motor windings 30. The selection of the number and size of these holes is within the ability of those of ordinary skill in the art and depends upon the exact dimensions of the corresponding motor and its associated parts.

Coolant flow from both the rotor and stator is received by drainage cavity 76. Drainage cavity 76 in turn drains liquid coolant via front drain port 78 and rear drain port 80 into coolant sump 82. Coolant exits coolant sump 82 via coolant outlet 84. Front shaft liquid seal 86 prevents liquid coolant from leaking via front rotor shaft bearing 26.

Turning to FIG. 2, a cross-sectional view depicts a rotor assembly 52, a stator assembly 88 and a housing 38 for an electric motor 12 in accordance with an embodiment. Rotor shaft 14, rotor core 16, stator core 28, and housing 38 are illustrated in detail. Rotor core 16 is typically structured form stacked magnetic laminations—with rotor bar slots 90 added to receive rotor bars 18—in accordance with conventional practices for induction motors. In accordance with an embodiment, rotor axial cooling slots 50, proximate the rotor bars 18 are added to provide coolant passages (axial passages parallel to the longitudinal axis of rotation 10) for additional cooling of the affected areas. Coolant flow which passes through these passages serves to remove heat generated within rotor bars 18 and the end rings 20, 22.

In accordance with an embodiment, the electric motor 12 includes an annular port 56 between the peripheral surface 70 of the stator core 28 and the inner surface 92 of housing 38. Coolant flow directed through this region serves to remove heat generated within the stator assembly 88 (both winding and core losses). With the addition of radially directed cooling fins 72 to the peripheral surface 70 of the stator core 28, this component of heat transfer is further improved. Yet further improvements in this component of heat transfer can be achieved where stator cooling slots 58 are included within stator core 28 to form axial passages such that coolant flow within these passages may provide additional heat transfer.

Optional Tie Rods 94 may be used to draw the opposing rotor endplates together such that the rotor core is compressed. This serves to improve the rotor rigidity, while minimizing pockets between laminations in which coolant can randomly collect. This helps avoid random accumulations of coolant between laminations which might result in degraded balance of the rotor.

Figure 3A:
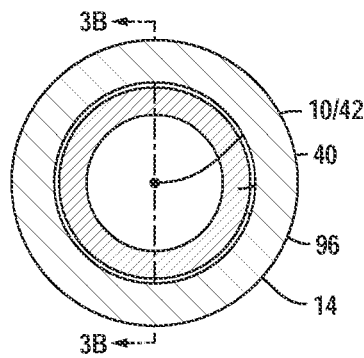
FIG. 3A is an end sectional view which depicts a coolant inlet and rotor shaft for an electric motor in accordance with an embodiment.
Figure 3B:
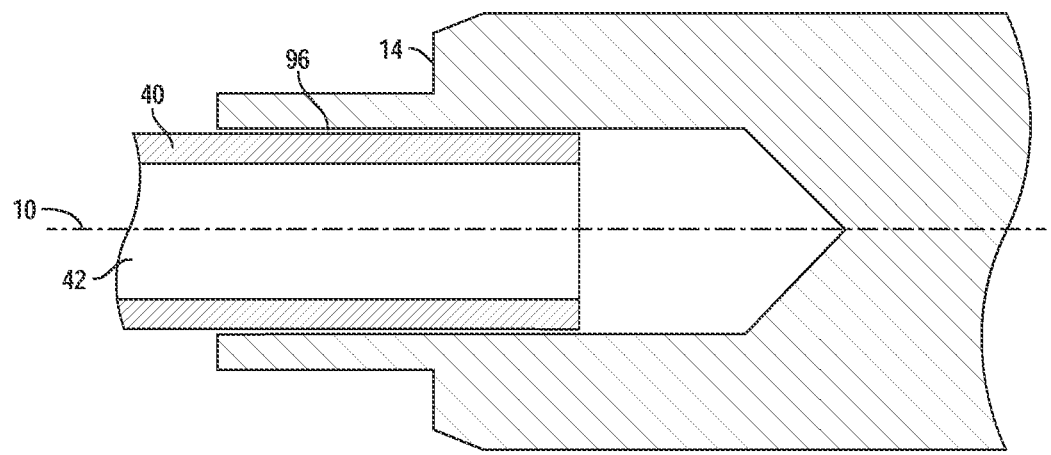
FIG. 3B is a cross sectional view taken along line 3B-3B of FIG. 3A.

FIG. 3A is a sectional view taken along the longitudinal axis of the motor and FIG. 3B is cross sectional view taken along line 3B-3B of FIG. 3A which depict a coolant inlet port 40 and rotor shaft 14 for an electric motor 12 in accordance with an embodiment. Coolant inlet port 40 and rotor shaft 14 are shown in detail. Inlet-shaft gap 96 exists between these two members (40, 14) which allows shaft rotation without significant friction. In turn, the inlet-shaft gap 96 causes a small "bypass flow" of coolant. This flow results in coolant drainage into drainage cavity 76 which in turn drains into coolant sump 82 via drain ports 78, 80.

Figure 4A:
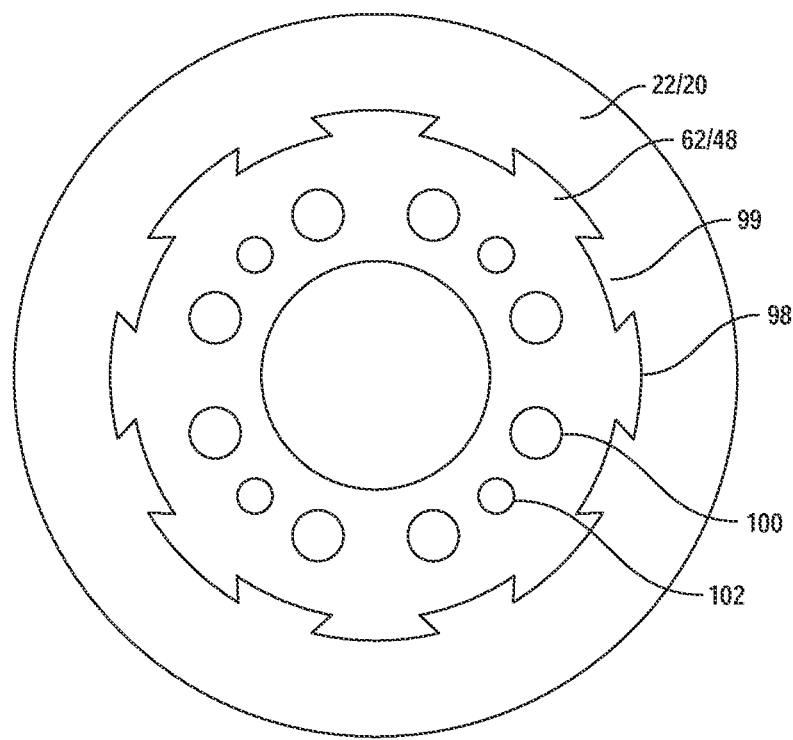
FIG. 4A is a front-side view which depicts a rotor end-plate and end ring for an electric motor in accordance with an embodiment.

FIG. 4A is a front-side elevational view which depicts a front-side end-view for the rotor assembly 52 in accordance with an embodiment. Rotor front endplate (62) and rear endplate (48) and corresponding cast end rings (20, 22) are illustrated in detail. (It should be noted that the rear 48 and front 62 endplates are similar.) Keyed elements 98 of the endplates engage corresponding keyed elements 99 of the end rings as shown in one example in order to provide attachment, radial support and retention for the end rings (22, 20) thus helping to prevent mechanical failure under high-speed conditions. They do this by engaging one another and any appropriate shape other than the symmetrical wedges 98, 99 as shown which accomplishes this may be used. Blind tapped holes 100 enable screws of selected sizes to be inserted into the endplates 62, 48 for the purpose of adjusting rotor balance. This approach eliminates the conventional need for machine removal of material to provide balance and thus enables the balance operation to be completed while the rotor is situated within the balance machine. (The conventional approach can, of course, be used instead if desired). Tie rod holes 102 are provided so that tie rods 94 can extend from rotor front endplate 62, through rotor core 16, to the rotor rear endplate 48 so that the entire rotor assembly 52 can be compressed.

Figure 4B:
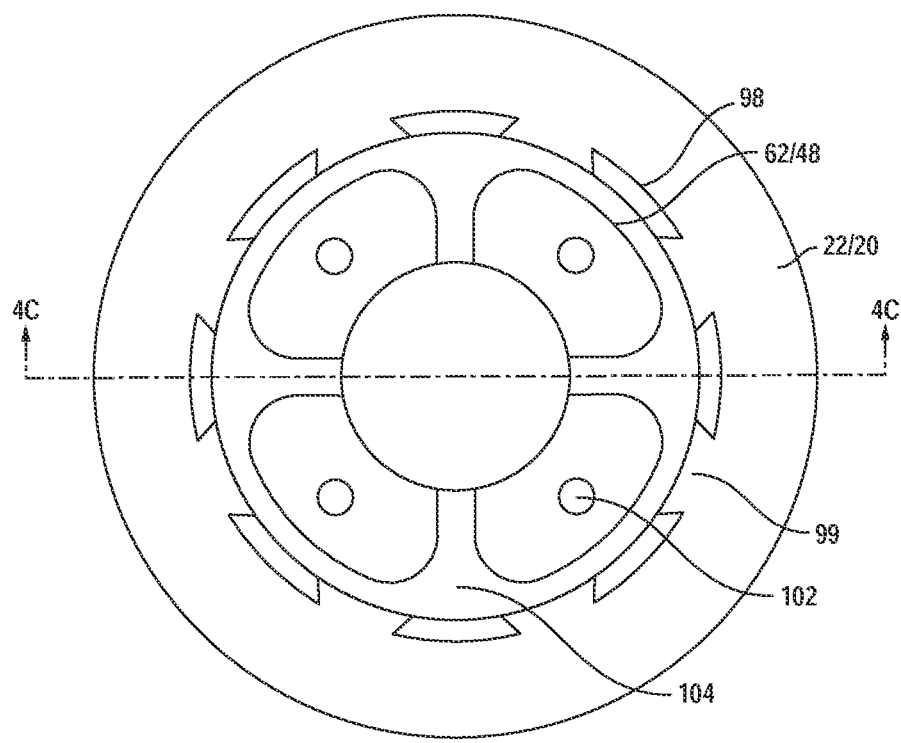
FIG. 4B is a rear-side view which depicts a rotor end-plate and end ring for an electric embodiment in accordance with an embodiment.

FIG. 4B is a front-side elevational view which depicts a front-side end-view for an electric motor 12 in accordance with an embodiment. Rotor front endplate (62) and rear endplate (48) and corresponding cast end rings (20, 22) are illustrated in detail. (It should be noted that the rear 48 and front 62 endplates are similar.) Endplate coolant channels 104 provide a coolant flow path from the exit points on rotor shaft 14 to entry points on the face of the rotor.

Figure 4C:
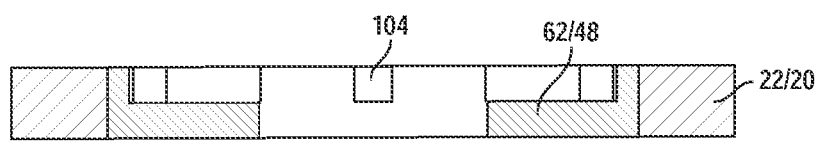
FIG. 4C is a section view taken along line 4C-4C of FIG. 4B which depicts a coolant channel for an electric motor in accordance with an embodiment.

FIG. 4C is a section view along line 4C-4C of FIG. 4B which depicts a coolant channel for an electric motor in accordance with an embodiment. Endplate coolant channels 104 are illustrated in detail.

Figure 5A:
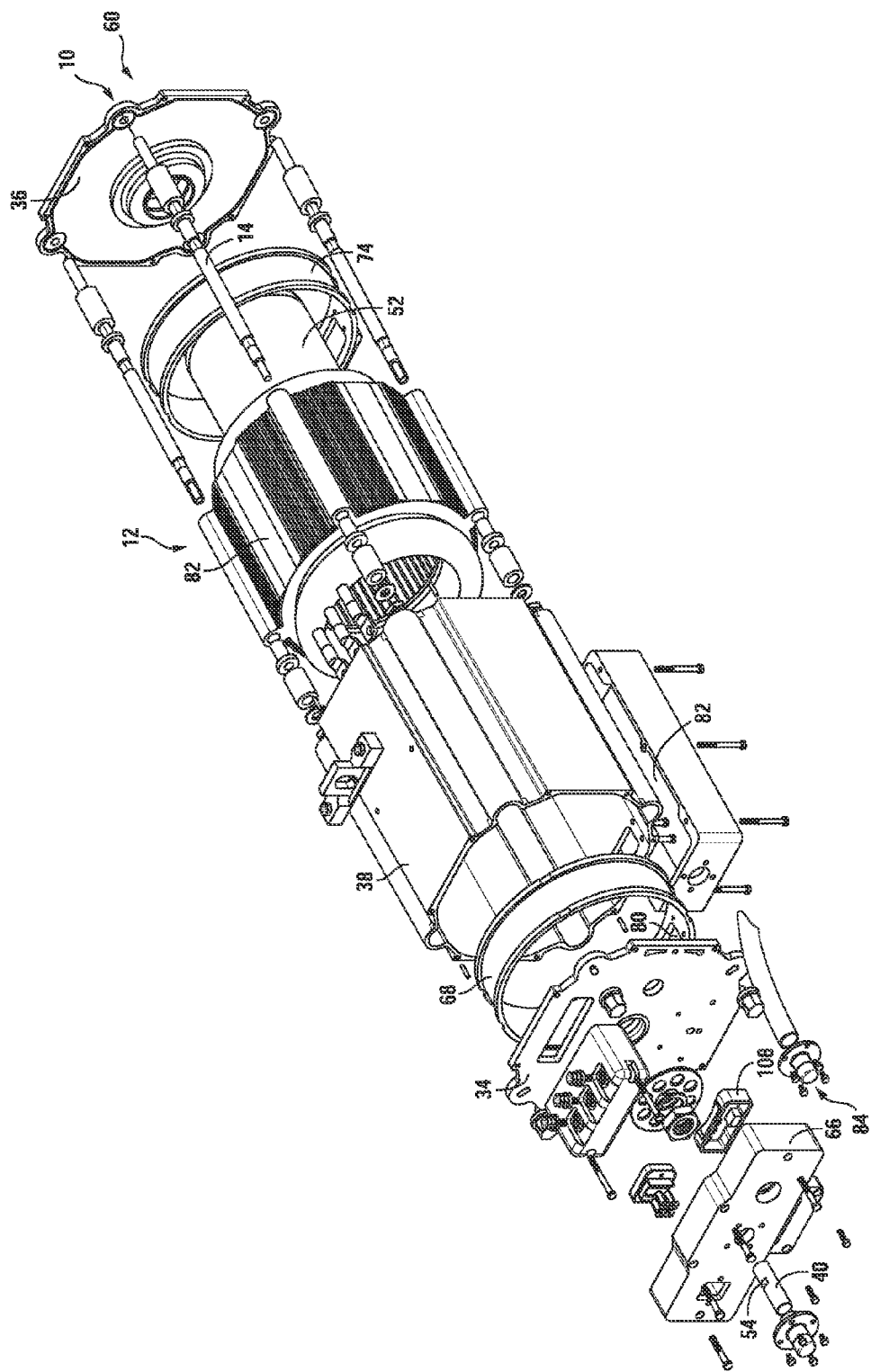
FIGS. 5A and 5B are, respectively, front and rear exploded views of a liquid-cooled electric motor in accordance with one embodiment.
Figure 5B:
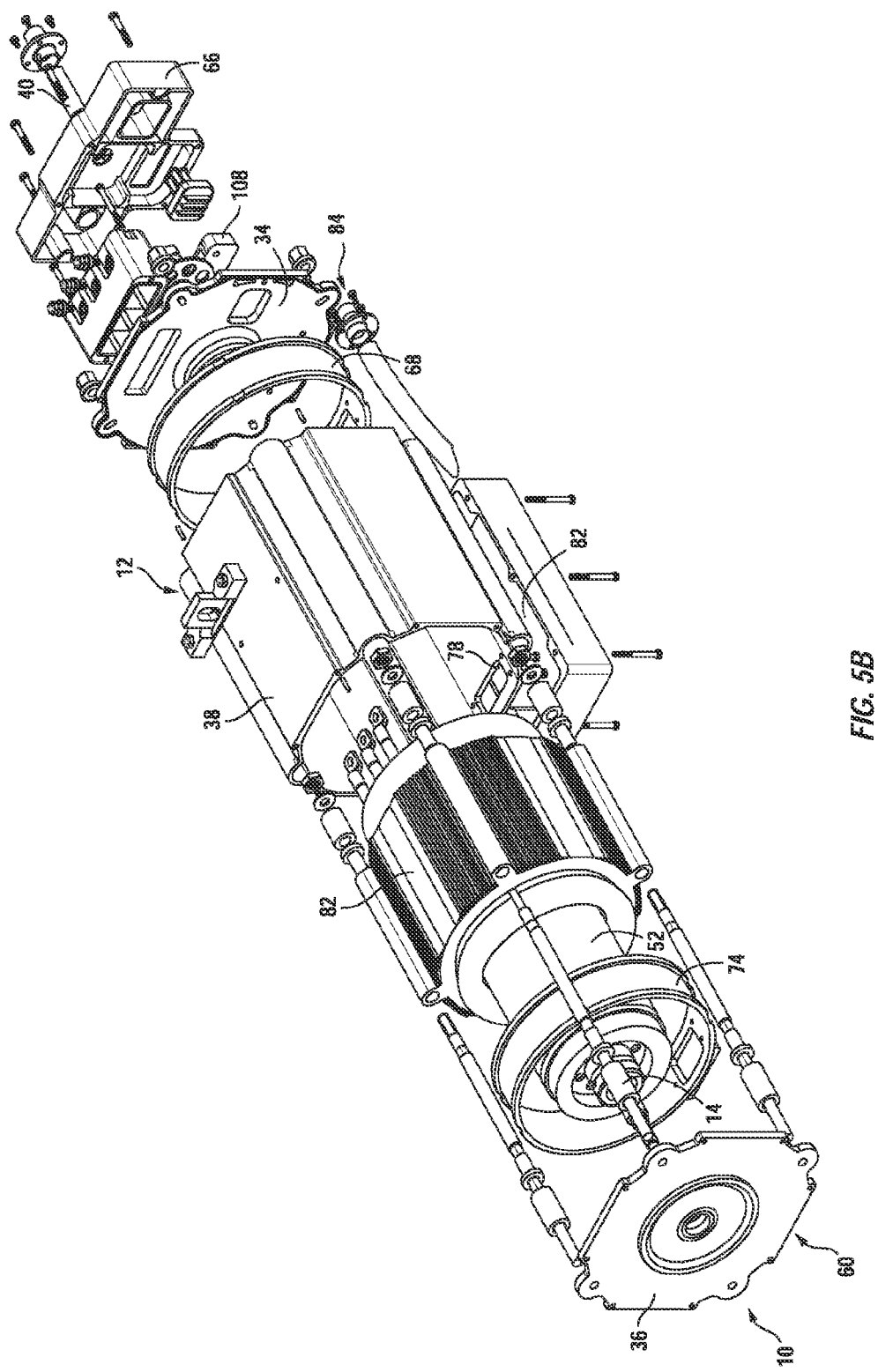

FIGS. 5A and 5B are, respectively, front and rear exploded views of a liquid-cooled electric motor in accordance with one embodiment.

Figure 6:
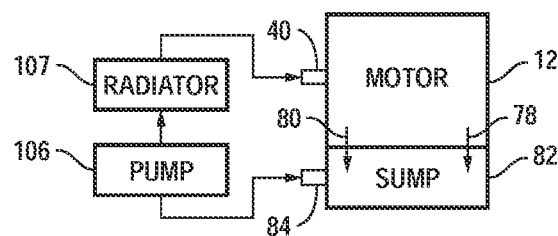
FIG. 6 is a system block diagram illustrating a liquid-cooled electric motor, sump and recirculating coolant pump in accordance with an embodiment.

FIG. 6 is a system block diagram illustrating a liquid-cooled electric motor 12, sump 82 configured to receive expended coolant from the motor 12 and recirculating coolant pump 106 configured to pump coolant from sump 82 to coolant inlet port 40 via a conventional radiator 107 for cooling the coolant in accordance with an embodiment. The coolant may be any suitable liquid which can withstand a breakdown voltage similar in magnitude to those present in the motor. Low-viscosity oils are presently preferred for this application although other suitable materials may be used as will now be apparent to those of ordinary skill in the art. The coolant quantity present in the motor should be limited so as to not flood the gap between the stator and the rotor. The stator and/or the rotor may be electrically insulated from the housing if desired. A rotor speed and/or position sensor 108 may be provided. Such sensors may be mounted to the stator, housing or end-bells (as shown) and optically observe the shaft or rotor (e.g., an optically detectable pattern thereon), or they may be coupled to the shaft. Magnetic sensors may also be used as can any other suitable sensors. Pump 106 may be disposed within sump 82 and may be attached to sump 82.

Figure 7A:
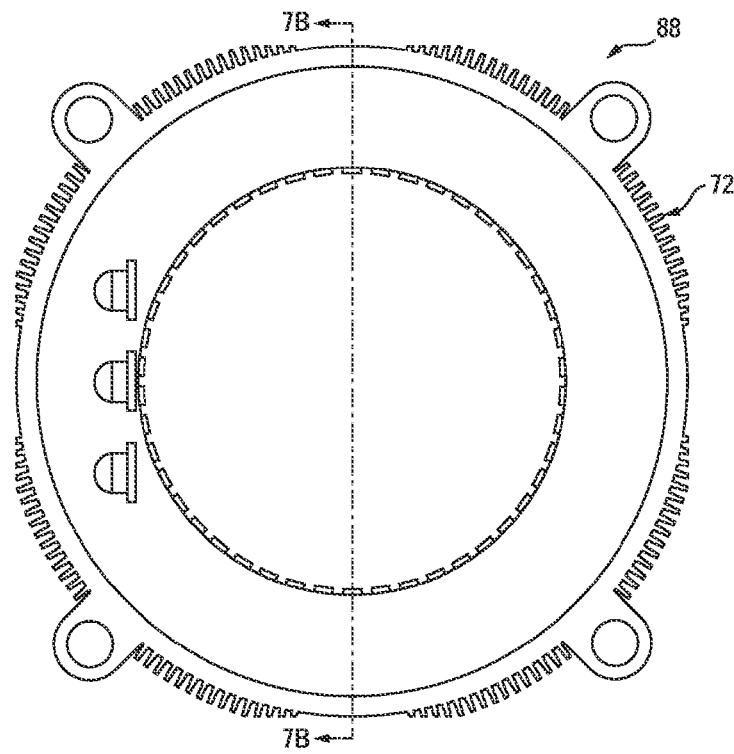
FIG. 7A is an end sectional view of a stator for an electric motor in accordance with an embodiment.
Figure 7B:
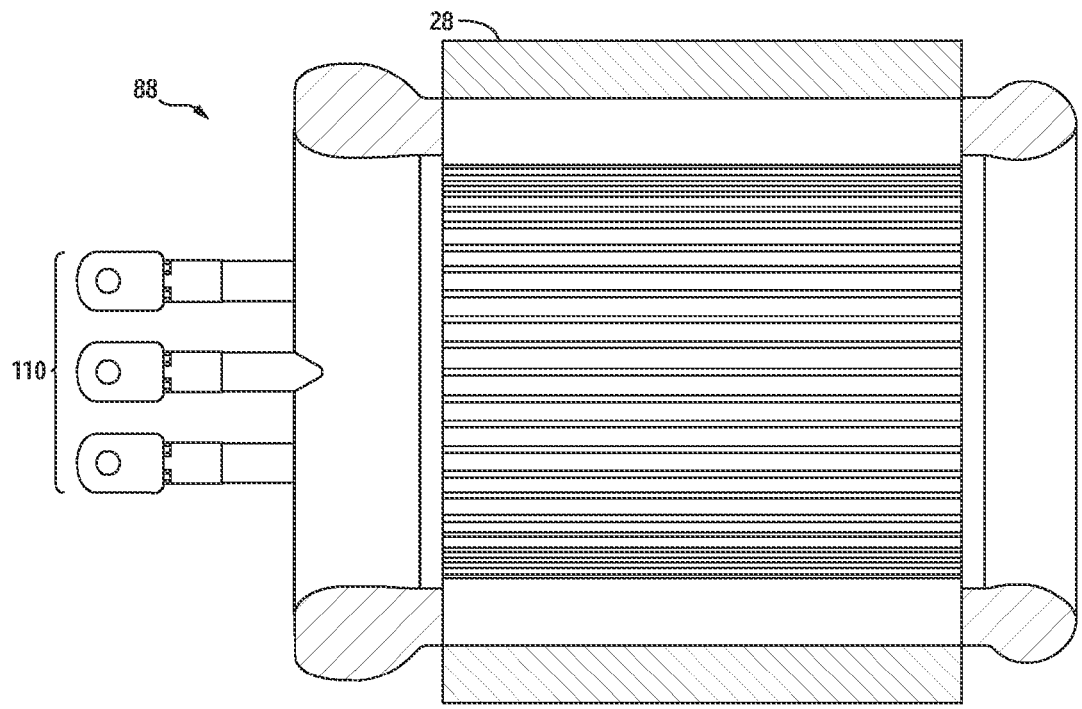
FIG. 7B is a cross sectional view taken along line 7B-7B of FIG. 7A.

FIG. 7A is an end sectional view of a stator for an electric motor in accordance with an embodiment and FIG. 7B is a cross sectional view taken along line 7B-7B of FIG. 7A. Electrical connections 110 to stator assembly 88 are shown.

Figure 8:
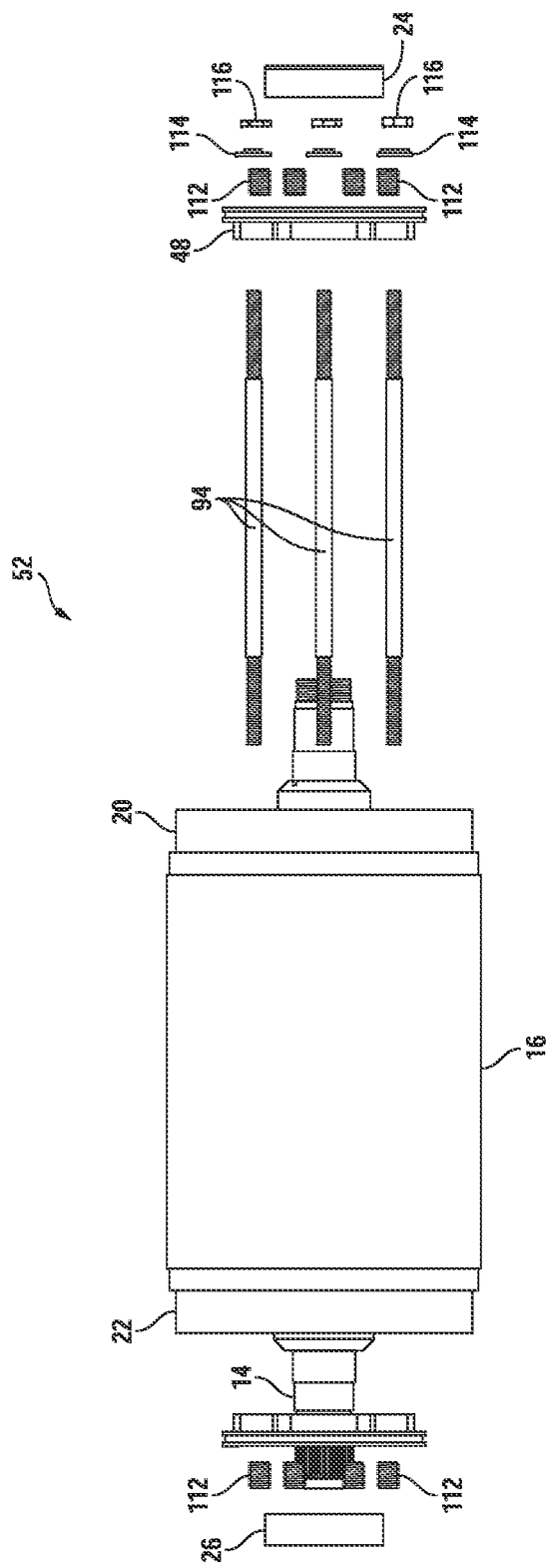
FIG. 8 is an assembly diagram of a rotor for an electric motor in accordance with an embodiment.

FIG. 8 is an assembly diagram of a rotor assembly 52 for an electric motor in accordance with an embodiment. In this embodiment balance screws 112 are used at the front and rear of the rotor assembly 52 to balance the rotor to reduce vibration during rotation. Tie rods 94 are secured with tie rod washers 114 and tie rod nuts 116.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A liquid-cooled, radial air gap electric motor comprising:
   a stator having motor windings;
   a rotor having an at least partially hollow rotor shaft configured to rotate about a longitudinal axis of rotation;
   a housing;
   a coolant sump disposed at the bottom of the housing;
   a first and a second end-bell, the first end-bell disposed at a first end of the motor housing and the second end-bell disposed at a second end of the motor housing, the first and second end-bells carrying rotor shaft bearings supporting the at least partially hollow rotor shaft; and
   a coolant manifold coupled to the first end-bell and configured to receive a liquid coolant through a coolant inlet port from a liquid coolant source and to distribute the liquid in at least a the first path into the at least partially hollow rotor shaft, wherein from the at least partially hollow rotor shaft the liquid coolant may flow radially outward in operation through one or more shaft radial holes in the at least partially hollow rotor shaft and then longitudinally into a rotor coolant passage formed in the rotor, and then into the sump, the second path radially outward in operation through one or more inlet radial holes in the coolant inlet port and then longitudinally into a peripheral coolant passage formed in a gap disposed between the housing and the stator, and then into the sump.

2. The electric motor of claim 1, wherein
   the coolant manifold includes a first circular coolant baffle that forms a first annular region bounded by the stator and the first coolant baffle and an inner surface of the housing.

3. The electric motor of claim 2, wherein
   the first coolant baffle includes at least one radially directed hole configured so that a portion of the second path of coolant flow is directed away from the first coolant baffle.

4. The electric motor of claim 2, wherein
   the motor is configured so that a portion of the second path of coolant flow is directed through a longitudinal passage within a stator core of the stator.

5. The electric motor of claim 2, wherein
   the peripheral surface of the stator is equipped with at least one radially directed cooling fin.

6. The electric motor of claim 2, further comprising:
   a second circular coolant baffle that forms a second annular region bounded by the stator and the second coolant baffle and an inner surface of the housing, the second annular region configured so that some coolant flow along the second path is directed from the peripheral coolant passage through at least one radially directed hole in the second coolant baffle away from the second coolant baffle.

7. The electric motor of claim 1, wherein the rotor further includes a plurality of rotor bars, a front end-ring and a rear end-ring.

8. The electric motor of claim 1, wherein the rotor is a wound rotor that includes a winding and at least one slip ring and brush.

9. The electric motor of claim 1, wherein the rotor contains at least one permanent magnet.

10. The electric motor of claim 1, wherein the rotor includes at least one rotor endplate that includes at least one axially directed, tapped hole configured so that a screw can be screwed into the tapped hole in order to adjust the mass balance of the rotor.

11. The electric motor of claim 10 wherein the endplate and an end-ring are mutually attached with at least one pair of corresponding keyed elements.

12. The electric motor of claim 1, wherein the stator is electrically insulated from the housing.

13. The electric motor of claim 1, wherein the rotor is electrically insulated from the housing.

14. The electric motor of claim 1, wherein the rotor and the stator are electrically insulated from the housing.

15. The electric motor of claim 1, further comprising:
a rotor speed sensor.

16. The electric motor of claim 1, further comprising:
a rotor position sensor.

17. The electric motor of claim 1, further comprising:
a front shaft liquid seal.

18. The electric motor of claim 1, wherein the quantity of coolant is limited so that a gap between the rotor and stator is not flooded with coolant during operation.

19. The electric motor of claim 1, wherein the coolant comprises a low viscosity oil.

20. The electric motor of claim 1, wherein the coolant is a liquid other than oil.

21. The electric motor of claim 2, wherein the first end-bell and the first coolant baffle are formed as a single part.

22. The electric motor of claim 21, wherein the second end-bell and the second coolant baffle are formed as a single part.

23. The electric motor of claim 1, further comprising a pump configured to pump coolant from the sump to the coolant inlet port.

24. The electric motor of claim 23, wherein the pump is disposed within the sump.

* * * * *